April 5, 1938.  G. H. BROWN ET AL  2,112,824

RADIO TRANSMITTER FOR DIRECTION FINDING DEVICES

Filed Oct. 23, 1935  2 Sheets-Sheet 1

INVENTORS
George H. Brown
David G. C. Luck

BY R. Goldsborough
ATTORNEY

Witnesses:

April 5, 1938.   G. H. BROWN ET AL   2,112,824
RADIO TRANSMITTER FOR DIRECTION FINDING DEVICES
Filed Oct. 23, 1935   2 Sheets-Sheet 2

INVENTORS
George H. Brown
David G. C. Luck
BY J. R. Goldsborough
ATTORNEY

Witness:
C. D. Tuska
Geo. L. Jepson

Patented Apr. 5, 1938

2,112,824

UNITED STATES PATENT OFFICE 2,112,824

RADIO TRANSMITTER FOR DIRECTION FINDING DEVICES

George H. Brown, Haddonfield, and David G. C. Luck, Woodbury, N. J., assignors to Radio Corporation of America, a corporation of Delaware Application October 23, 1935, Serial No. 46,246

16 Claims. (Cl. 250—11)

Our invention relates broadly to direction indicating devices. More specifically, our invention relates to a radio transmission system which radiates a horizontally polarized rotating field and a vertically polarized field in constant phasal relation thereto which conveys a direction indicating characteristic to a receiving system at any remote point.

We are aware of numerous radio devices, such as beam transmitters, earth inductors, "homing devices" and the like. The beam transmitters have a field of service limited to the useful paths of the beams. The earth inductors are dependent on the earth's field, involve rotating elements, and several compass errors may occur. The homing devices require manual control, are limited to the useful areas of the established transmitters, and merely indicate direction with respect to the moving vehicle. We propose to employ novel means which do not require rotational members. Our invention is independent of the orientation of the receiving system, and in its preferred form requires no manual control at either the transmitter or the receiver. It also indicates the bearing of the receiver with respect to the transmitter without reference to a magnetic compass.

One of the objects of our invention is to provide means for producing a rotating field with a constant phasally related indicator.

Another object is to radiate a horizontally polarized rotating field with a constant phasally related vertically polarized field.

A further object is found in the means for receiving the rotating field which gives indications of the relative direction of the receiver with respect to the transmitter.

An additional object is in a receiving system which may be manually adjusted to directly indicate the bearing of the receiver with respect to the transmitter.

A still further object is to directly indicate the position of the receiver with respect to two or more rotating field transmitters.

Additional objects will be found in the accompanying specification and appended claims.

Figure 1:
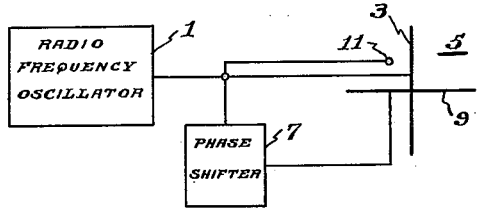
Figure 2:
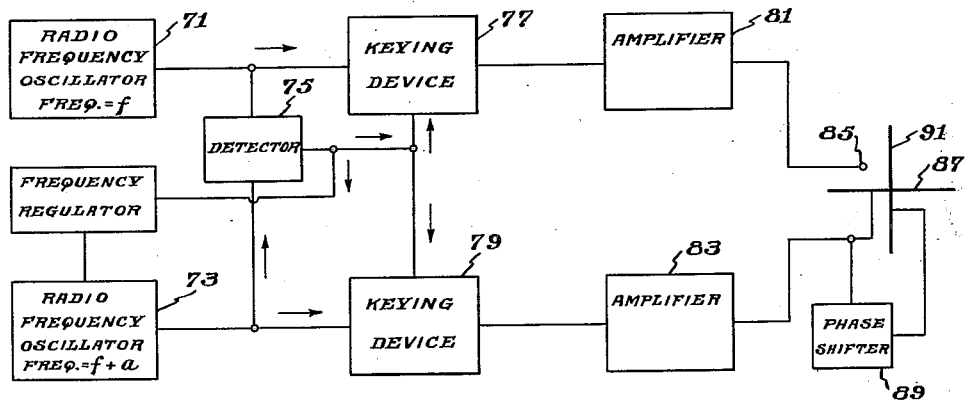
Figure 3:
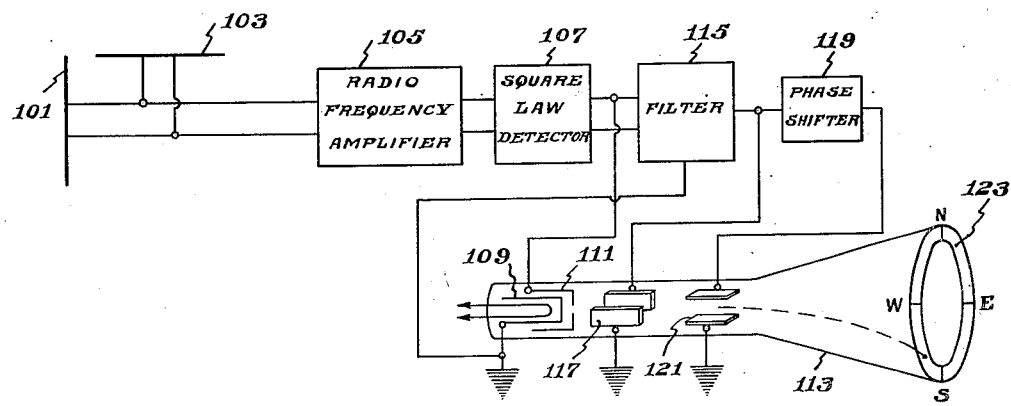
Figure 4:
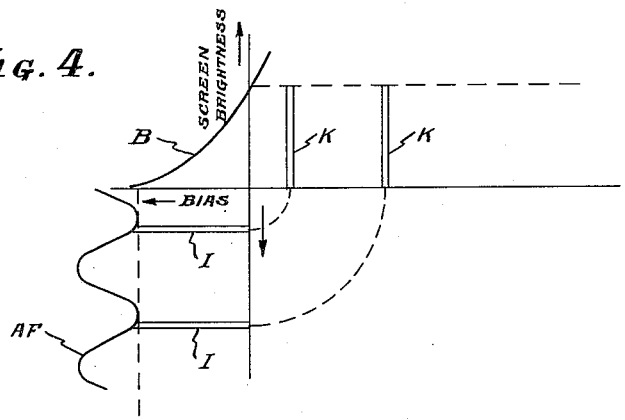
Figure 5:
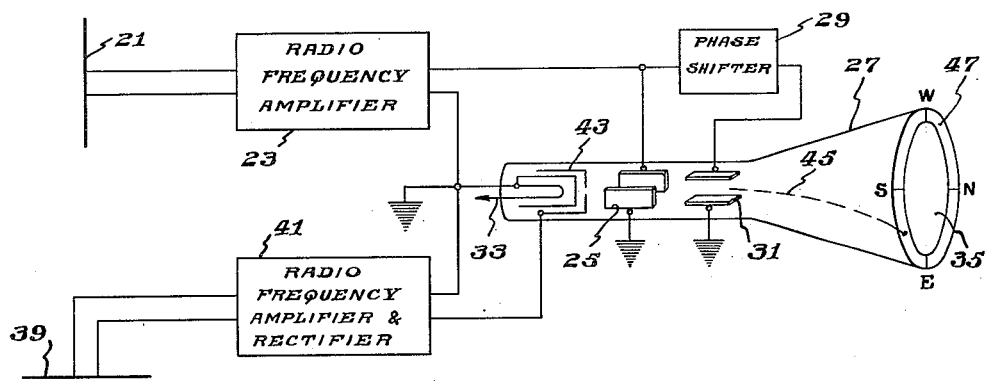
Figure 6:
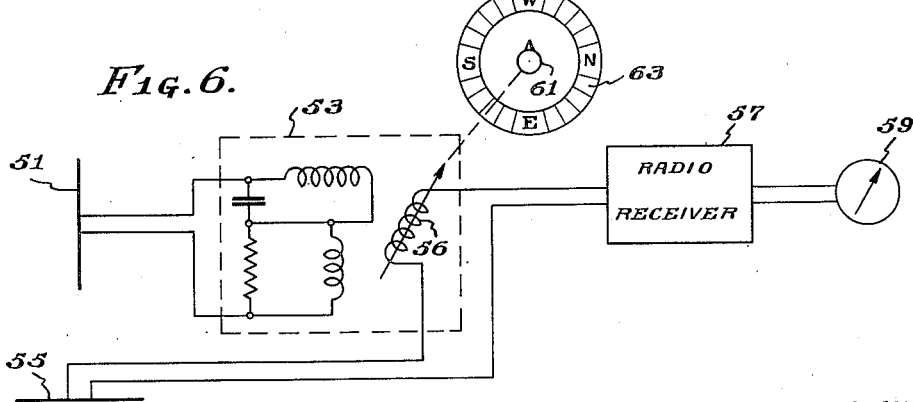

Our invention may be best understood by reference to the accompanying drawings in which Figure 1 is a schematic diagram of the transmission system, Fig. 2 is a diagram of a modified form of transmitter, Fig. 3 is a diagram of one embodiment of our invention in a radio receiving system, Fig. 4 is an illustration representing the operation of part of the receiving system, Fig. 5 is a schematic diagram of another embodiment of our receiving system, and Fig. 6 is a schematic diagram of a further embodiment of our invention in a radio receiving system.

In the copending application Serial No. 41,349 entitled Antenna systems, filed by George Harold Brown, Patent No. 2,086,976, dated July 13, 1937 and assigned to the same assignee as the present application, is described a turnstile antenna. An antenna of that type radiates a rotating field. The field pattern is circular in shape and rotates around the antenna once for every cycle of the transmitted frequency. In Fig. 1 a source 1 of oscillatory radio frequency energy, which may include a constant frequency oscillator, frequency multipliers, radio frequency amplifiers and the like, is shown as connected to one set of horizontal elements 3 of a turnstile antenna 5. A phase shifter 7 is connected between the radio frequency source 1 and the other set of horizontal elements 9. The power source is not, per se, part of this invention and since radio frequency generators are well known, we believe a detailed illustration is unnecessary. By way of example, the phase shifter 7 may be a transmission line having an electrical length sufficient to give quadrature phase relations between the currents flowing in the respective sets of horizontal antenna elements. The horizontal elements are preferably of a length not exceeding a half wave length. They are positioned at right angles forming a symmetrical cross. A vertical antenna element 11 is connected to the radio frequency source 1. The vertical element is at right angles to each of the horizontal elements 3—9 and preferably adjacent thereto. The currents fed to the vertical element bear a constant phase relation to the currents in the horizontal elements.

The horizontal antenna elements radiate a horizontal polarized field which, as previously described, rotates about the antenna. The vertical antenna element radiates a vertically polarized field. At any point remote from the antenna a vertically polarized field will be established due to radiation from the vertical antenna. Likewise, a horizontally polarized field will have a maximum which sweeps past the remote point. By relating the phase of the two fields, the direction of the transmission antenna from any remote point may be definitely established. We prefer to arrange the phases at the transmitter so that the instant of occurrence of the maximum fields coincides at a point due north of the transmitter. This may be done mechanically by rotating the antenna system—or electric rotation may be effected by suitable phasing devices.

One form of receiving system is shown in Fig. 5. A vertical antenna element 21 is connected to a suitable radio frequency amplifier 23. The output of the amplifier is connected across one pair of deflecting plates 25 of a cathode ray tube 27.

The output is also connected through a 90° phase shifter 29 across another pair of deflecting plates 31. The cathode ray is emitted from the cathode 33 in the usual manner. The cathode ray beam has the usual accelerating electrodes (not shown) and is caused to rotate by the potentials on the deflecting plates. The beam is preferably focused so that it normally does not reach the fluorescent screen 35. A horizontal antenna 39 is connected to second radio frequency amplifier 41. The output of this amplifier is connected to the control electrode 43 which may be within the cathode ray tube. The control electrode is normally biased so that the cathode ray does not reach the screen. If the bias is decreased by the maximum voltage derived from the rotating field, the beam will be focused for an instant on the fluorescent screen and indicate as shown by the heavy broken line 45.

The maximum rotating field indicates the relative position with respect to the meridian because the transmitter has been phased to have the instant of occurrence of the maximum of the vertical and horizontal fields coincide at due north. If the receiver is north of the transmitter, the maximum of both fields will occur at the same instant. The receiver has a compass card 47 which is adjusted for a north indication when the receiver is north of the transmitter. If the receiver is moved to due east of the transmitter, the maximum rotating field will occur 90° later and will indicate east. Likewise, if the receiver is south of the transmitter, the maximum rotating field will occur 180° later and will indicate south.

In the receiver illustrated in Fig. 5, a difficulty is experienced if the horizontal antenna is rotated 180°. The bias voltage is derived from currents induced in the horizontal antenna. If the antenna is rotated 180°, the bias voltage will likewise change 180° and a false bearing will be indicated. The false bearing will, of course, be 180° from the true bearing. This difficulty may be overcome by using a horizontal loop antenna which takes the place of the horizontal antenna element. The phase of the voltage induced in the loop from the magnetic field component will be independent of the position of the loop as long as it remains horizontal. The loop as a whole may also be arranged to act as a capacity antenna for the vertical field. If this receiver, using the horizontal loop, is placed on a vehicle, such as an airplane, the indications will show the true bearing from the transmitter irrespective of the direction in which the receiver is pointing. The radio frequency amplifiers connected to the vertical and horizontal antenna devices should be balanced to avoid any relative phase shifting which would cause false bearings.

A simplified form of receiver is schematically illustrated in Fig. 6. A vertical antenna 51 is connected to a phase shifter 53. A horizontal antenna 55 is connected to the movable element 56 of the phase shifter, and to the receiver. A radio receiver 57 is connected to the output of the phase shifter. An indicating device 59, such as a meter, is connected to the output of the receiver. The adjustable element of the phase shifter is equipped with a knob and pointer 61 and a compass card 63. The phase shifter is adjusted until the horizontal field and the vertical field set up currents which exactly oppose each other and represent a minimum indication of the output meter. The compass card is arranged so that it will indicate directly the true bearing from the transmitter when the adjustment has been made.

The foregoing systems employ a relatively simple transmitter but require the balanced receivers or the manual phase shifter for receiving. Since numerous receivers may be employed and relatively few transmitters we prefer to arrange the more complicated apparatus at the transmitter so that the receivers may be simplified. In Figure 2 we have shown a modified transmitter in which a keying device is employed. A pair of constant frequency oscillators 71, 73 are connected to a detector 75. The oscillators have been chosen so that their frequencies differ by an amount which causes audio frequency beat currents to be generated in the detector.

The audio frequency currents derived from the detector control a pair of keying devices 77, 79. The keying devices may be vacuum tubes which are suitably biased by the audio frequency currents from the detector output. The keying devices interrupt the transmission for a very brief period at a constant audio frequency rate and fixed phasal relation. That is for each beat and at the same relative phase the transmitters are simultaneously cut-off. The beat frequency is preferably kept constant to make the filtering in the receiver effective. It may be best accomplished by direct control of the beat frequency rather than the use of extremely precise fixed frequency oscillators. This may be accomplished by feeding the audio frequency from the detector to an audio frequency bridge balanced for the desired frequency and utilizing the unbalance output to adjust the frequency of the radio frequency oscillator 73.

The outputs of the two radio frequency oscillators may be amplified by suitable radio frequency amplifiers 81, 83. The output from one of the amplifiers 81 is connected to the vertical antenna 85. The output from the other amplifier 83 is connected directly to one set of horizontal antenna elements 87 and, through a 90 degree phase shifter 89, to the other set of horizontal antenna elements 91.

In this embodiment of our invention the horizontally polarized radiation rotates about the antenna. The vertically polarized radiation has a field pattern of circular shape. This action is similar to that previously described. The simultaneous interruption of each transmitter for a very brief instant by the keying means simultaneously cuts off each field. This interruption is made once per cycle of the beat frequency and at a fixed angular position with respect to the beat note. The keying of the transmitter is so phased that a receiver due north of the transmitter will generate an audio frequency output whose peaks occur at the instant of the keying and whose frequency corresponds to the audio beat which actuates the keyer. Thus the keying and the indication are in phase. As the receiver is moved around the transmitter, the relative phase of the keying and the sinusoidal beat note varies in the same manner as the relative phase of the vertical and horizontal fields of Figure 1.

The receiver for this type of transmission may be greatly simplified over the arrangements previously described. In Figure 3 a vertical antenna 101 and a horizontal antenna 103 are connected to a radio frequency amplifier 105. The output of the amplifier is connected to a detector 107. This detector is preferably of the square law type. The detector output is connected to a cathode 109 and control electrode 111 of a cathode ray tube 113. The detector output is also passed through a filter 115 and the desired audio frequency currents in the output of the filter are impressed across a pair of deflecting electrodes 117 in the cathode ray tube. The audio currents are also passed through a ninety degree phase shifter 119, and impressed across another pair of deflecting electrodes 121.

The cathode ray is emitted from the cathode in the usual manner. Accelerating electrodes (not shown) direct the ray toward the fluorescent screen 123. The control electrode 111 may be biased so that either the ray does not strike the screen, or strikes the screen and leaves a very faint trace. The square law detector operates in the well known manner and produces several different audio frequency currents. Of these currents, one is an audio frequency current corresponding to the beat note of the two oscillators; another is a direct current pulse corresponding to the interruption of the transmitters. Other currents of radio frequencies are present in the detector output but are not employed in this invention. The audio frequency currents are applied, after filtering, to one pair of deflector electrodes and after a ninety degree phase shift to the other pair of deflector electrodes. The potentials on the deflecting plates rotate the cathode ray at an audio frequency rate which is in phase with the audio beat frequency set up by the two transmitters. Normally the rotating cathode ray is not impinged on the fluorescent screen but is cut off or suppressed by the bias on the control electrode. At the instant when the transmitters are keyed or interrupted, the bias of the control electrode is removed and the cathode ray strikes the fluorescent screen indicating the bearing of the receiver from the transmitter. The operation may be expressed in diagrammatic form shown in Figure 4. The audio frequency current variations are indicated as AF. The interruptions due to keying are represented as I. The effect of the bias voltage on the screen brilliance is shown as B. The indications on the screen are shown as K.

In setting up the receiver a compass card is arranged about the screen so that the interruption pulse or indication corresponding with north at the transmitter occurs at north on the card. That is when the receiver is due north of the transmitter, the indication on the screen compass card is north because the transmitter is south of the receiver. Thereafter no further regulation or adjustment is required. The phase of the interruption of the transmitter with respect to the rotating field determines the bearing of the receiver with respect to the transmitter.

Since the audio beat frequency generated from the transmitter fields and the rotation of the cathode ray are in synchronism, it is apparent that the phase of the interrupting current at the receiver with respect to its rotating cathode ray depends solely upon the bearing of the receiver with respect to the transmitter. The receiver may be installed on an aircraft, and will indicate the true bearing from the transmitter irrespective of the direction in which the aircraft is pointed. Likewise if two transmitters are used the bearing from each will be indicated and the exact position of the receiver with respect to the transmitters may be determined.

Numerous modifications within the scope of our invention will occur to those skilled in the art. By way of example, mechanical keying may be substituted for the electrical keying. The receiver may employ a small synchronous motor driven by the audio frequency current created by the beat frequency, and the indicator impulse may be established by a stroboscopic effect caused by the flashing of a neon light. Telephonic transmission, such as weather reports, may be effected by impressing suitable modulation currents on either or both carrier currents. The voice frequency currents may be separated from the audio beat currents by suitable filters. In this manner a single system may be used for simultaneous transmission of two signals. We do not intend to limit the scope of our invention except as required by the prior art and the appended claims.

We claim as our invention:

1. In a direction finder, a generator of a radio frequency energy of a predetermined frequency, means for radiating said energy in a horizontally polarized rotating field, a second generator of radio frequency energy whose frequency differs from the first mentioned frequency, means for radiating the second mentioned energy in a vertically polarized field, and means for interrupting one or both of said fields at said difference frequency rate.

2. In a direction finding system, means for radiating a horizontally polarized rotating field, means for radiating a vertically polarized field, means for establishing a frequency difference between said fields, means for interrupting one of said fields at said difference frequency, means for maintaining desired phasal relations between said frequency difference and said interruptions, and means for indicating the relative phase of the interruptions and currents produced by detecting said fields at a position remote from the point of origin of said fields.

3. In a direction finding system, means for radiating a horizontally polarized rotating field, means for radiating a vertically polarized field, means for maintaining constant phasal relations between said fields, means responsive to said vertical field, means responsive to said horizontal field, and a cathode ray tube having deflecting electrodes positioned at right angles to each other and a control electrode, a connection from one of said deflecting electrodes to one of said field responsive means, a connection from said deflecting electrodes through a 90° phase shifter to the other of said deflecting electrodes, and a connection from said control electrode to the other of said field responsive means for indicating the relative phases of said fields.

4. In a direction finding system, means for radiating a horizontally polarized rotating field, means for radiating a vertically polarized field, means for maintaining constant phasal relations between said fields, and means for indicating the respective phases of said fields at a position remote from the point of origin of said fields including means responsive to said vertical field, means responsive to said horizontal field, a radio receiver including an indicator and said field responsive means, and continuously variable manual means for shifting the relative phase of currents derived from said fields to produce a null point on said indicator when said phases are substantially opposite.

5. In a direction finding system, means for radiating a horizontally polarized rotating field, means for radiating a vertically polarized field, means for maintaining constant phasal relations between said fields, means responsive to said vertical field, means responsive to said horizontal field, and a cathode ray tube having deflecting electrodes positioned at right angles to each other and a control electrode, a connection from one of said deflecting electrodes to said horizontal field responsive means, a connection from said deflecting electrodes through a 90° phase shifter to the other of said deflecting electrodes, and a connection from said control electrode to said vertical field responsive means for indicating the relative phases of said fields.

6. In a direction finder, a generator of radio frequency energy of a predetermined frequency, means for radiating said energy in a horizontally polarized rotating field, a second generator of radio frequency energy whose frequency differs from that of the first mentioned generator, means for radiating the second mentioned energy in a vertically polarized field, means for interrupting said fields at an audio frequency rate equal to said difference in frequency, and means for indicating the relative phase of currents derived from the interruption of said fields and the audio frequency current derived by simultaneously detecting currents derived from the fields.

7. In a direction finder, a generator of radio frequency energy of a predetermined frequency, means for radiating said energy in a horizontally polarized rotating field, a second generator of radio frequency energy whose frequency differs from that of the first mentioned generator, means for radiating the second-mentioned energy in a vertically polarized field, means for interrupting said fields at an audio frequency rate equal to the difference in the first and second mentioned radio frequencies, and means for determining the relative phases of an audio frequency current derived by simultaneously detecting said fields and a current derived from the interruption of said fields, which means include an antenna element responsive to the horizontally polarized field and an antenna element responsive to the vertically polarized field, each effectively connected to a radio frequency amplifier whose output circuit includes a detector and a filter for currents of said predetermined audio frequency, a cathode ray tube including deflecting electrodes having connections to said filter and a phase shifter whereby the cathode ray tends to rotate at an audio frequency rate, and a connection from said detector to a control electrode in said cathode ray tube whereby the relative phases of said audio frequency currents and said interrupted current are indicated by said cathode ray tube.

8. In a direction finder, a generator of radio energy of a predetermined frequency, means for radiating said energy in a horizontally polarized rotating field, a second generator of radio energy whose frequency differs from that of the first mentioned generator, means for radiating the second mentioned energy in a vertically polarized field, means for interrupting said fields at an audio frequency rate equal to the difference in the first and second mentioned radio frequencies, and means for indicating the relative phases of currents determined by the interruption of said fields and the audio frequency currents which are derived by mixing said radio frequency currents in a detector at a position remote from the point of radiation of said polarized fields.

9. In a direction finder, means for generating a horizontally polarized radio frequency field of unvarying magnitude, means for rotating said horizontal field, means for radiating said field, means for generating a vertically polarized radio frequency field varying in synchronism with the rotation of said horizontal field, means for radiating said vertical field non-directionally, and mean for maintaining constant phasal relations between said fields at their point of origin.

10. In a direction finder, means for generating a horizontally polarized radio frequency field of unvarying magnitude, means for rotating said horizontal field, means for radiating said field, means for generating a vertically polarized radio frequency field varying in synchronism with the rotation of said horizontal field, means for radiating said vertical field non-directionally, means for producing and maintaining desired constant phasal relations between said fields, means for adjusting said radiation so that the maximum field strength of each of said fields may be made to coincide in a predetermined direction.

11. In a direction finder, means for generating a horizontally polarized radio frequency field of unvarying magnitude, means for rotating said horizontal field, means for radiating said field, means for generating a vertically polarized radio frequency field, means for maintaining desired phasal relations between said fields, and means for indicating the relative phase of said fields at a position remote from the point of origin of said fields.

12. The method of transmitting directional indications from a radio beacon which comprises generating a horizontally polarized radio frequency field of unvarying magnitude, rotating said field, radiating said field, generating a vertically polarized radio frequency field, varying said vertical field in synchronism with the rotation of said horizontal field, radiating said vertical field substantially non-directionally, and maintaining constant phasal relations between said fields.

13. The method of transmitting directional indications from a radio beacon which comprises generating a horizontally polarized radio frequency field of unvarying magnitude, rotating said field, radiating said field, generating a vertically polarized radio frequency field, varying said vertical field in synchronism with the rotation of said horizontal field, radiating said vertical field substantially non-directionally, maintaining constant phasal relations between said fields, and adjusting the radiation of said fields so that the maximum field strength coincides in a predetermined direction.

14. The method of indicating direction which comprises the steps set forth in claim 12 and the additional step of indicating the relative phase of said fields at a position remote from their origin.

15. The method of transmitting directional information which comprises generating radio frequency currents of differing frequencies, radiating a horizontally polarized field created by one of said currents, radiating a vertically polarized field created by the other of said currents, interrupting one of said fields at said difference frequency, and maintaining the phasal relation between said interruption frequency and said difference frequency.

16. The method of indicating direction which comprises transmitting direction bearing information in accordance with claim 15 and indicating the relative phase of said interruption frequency and currents produced by said fields at a point remote from their origin.

GEORGE H. BROWN.
DAVID G. C. LUCK.